United States Patent
Lee et al.

(10) Patent No.: US 7,999,258 B2
(45) Date of Patent: Aug. 16, 2011

(54) DISPLAY SUBSTRATE AND METHOD OF MANUFACTURING THE SAME

(75) Inventors: Jae-Bok Lee, Seoul (KR); Chun-Gi You, Hwaseong-si (KR); Sang-Hyun Jun, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 626 days.

(21) Appl. No.: 12/079,723

(22) Filed: Mar. 27, 2008

(65) Prior Publication Data

US 2009/0020758 A1 Jan. 22, 2009

(30) Foreign Application Priority Data

Jul. 18, 2007 (KR) .................. 10-2007-0071549

(51) Int. Cl.
 *H01L 21/00* (2006.01)
(52) U.S. Cl. .................. 257/59; 257/762; 257/268
(58) Field of Classification Search .................. 257/59, 257/762, 268
 See application file for complete search history.

(56) References Cited

U.S. PATENT DOCUMENTS

| | | | | | |
|---|---|---|---|---|---|
| 6,008,065 | A | * | 12/1999 | Lee et al. | 438/30 |
| 6,081,308 | A | * | 6/2000 | Jeong et al. | 349/42 |
| 6,331,443 | B1 | * | 12/2001 | Lee et al. | 438/30 |
| 6,339,230 | B1 | * | 1/2002 | Lee et al. | 257/88 |
| 7,586,197 | B2 | * | 9/2009 | Lee et al. | 257/762 |
| 7,851,920 | B2 | * | 12/2010 | Lee et al. | 257/762 |
| 7,880,833 | B2 | * | 2/2011 | Shin et al. | 349/106 |
| 2002/0106825 | A1 | * | 8/2002 | Lee et al. | 438/30 |
| 2009/0020758 | A1 | * | 1/2009 | Lee et al. | 257/59 |
| 2009/0185094 | A1 | * | 7/2009 | Lee et al. | 349/46 |
| 2009/0286386 | A1 | * | 11/2009 | Lee et al. | 438/586 |
| 2011/0047792 | A1 | * | 3/2011 | Lee et al. | 29/825 |

FOREIGN PATENT DOCUMENTS

| | | |
|---|---|---|
| JP | 2000-89255 | 3/2000 |
| KR | 10-2004-0012222 | 2/2004 |
| KR | 10-2005-0114800 | 12/2005 |

OTHER PUBLICATIONS

Patent Abstracts of Japan, Publication No. 2000-089255, Mar. 31, 2000, 1 p.
Korean Patent Abstracts, Publication No. 1020040012222, Feb. 11, 2004, 1 p.
Korean Patent Abstracts, Publication No. 1020050114800, Dec. 7, 2005, 1 p.

* cited by examiner

*Primary Examiner* — Laura M Menz
(74) *Attorney, Agent, or Firm* — Innovation Counsel LLP (57) ABSTRACT

A display substrate includes a base substrate, a first metal pattern, a second metal pattern, a first transparent conductive layer and a second transparent conductive layer. The first metal pattern is formed on the base substrate, and includes a gate line and a gate electrode connected to the gate line. The second metal pattern includes a data line crossing the gate line, a source electrode connected to the data line and a drain electrode being spaced apart from the source electrode. The first transparent conductive layer includes a capping layer capping the second metal pattern and a common electrode formed in a pixel area. The second transparent conductive layer includes a pixel electrode having a plurality of openings, contacting the capping layer capping the drain electrode, and facing the common electrode.

8 Claims, 10 Drawing Sheets

FIG. 9 ically claims priority under 35 U.S.C. §119 to
DISPLAY SUBSTRATE AND METHOD OF MANUFACTURING THE SAME

CROSS-REFERENCE TO RELATED APPLICATIONS

This application claims priority under 35 U.S.C. §119 to Korean Patent Application No. 10-2007-71549, filed on Jul. 18, 2007 in the Korean Intellectual Property Office (KIPO), the contents of which are herein incorporated by reference in their entirety.

BACKGROUND OF THE INVENTION

1. Field of the Invention

The present invention relates to a display substrate and a method of manufacturing the display substrate. More particularly, the present invention relates to a display substrate used for a display device and a method of manufacturing the display substrate, which is capable of improving yield.

2. Description of the Related Art

In order to improve a wide viewing angle, various liquid crystal mode techniques, such as an in-plane switching (IPS) mode, a fringe field switching (FFS) mode have been developed. The IPS mode includes a pixel electrode and a common electrode formed on the same surface as a surface of the pixel electrode. Thus, an electric field generated between the pixel and the common electrodes is a horizontal electric field substantially parallel with a surface of display substrate. In the IPS mode, liquid crystal molecules are rotated in a direction substantially parallel with the surface of the display substrate, so that an anisotropic difference for a refractive index of the liquid crystal molecules viewed by a viewer is small and liquid crystal layers having different rotation directions of the liquid crystal molecules opposite to each other are formed in a vertical section of a display panel. Thus, the IPS mode compensates for a phase difference of light to improve the viewing angle.

The FFS mode has a similar concept to the IPS mode in that liquid crystal molecules are aligned using a horizontal electric field. However, the FFS mode includes a pixel electrode, and a common electrode formed on a surface different from the surface of the pixel electrode, so that the liquid crystal molecules are aligned by using the horizontal electric field and a vertical electric field.

In the FFS mode, the liquid crystal molecules are aligned by using the vertical electric field to have increased transmissivity. In addition, the viewing angle of the FFS mode is also increased as in the IPS mode, because the liquid crystal molecules move in the horizontal direction.

SUMMARY OF THE INVENTION

The present invention provides a display substrate capable of improving yield.

The present invention further provides a method of manufacturing the display substrate.

A display substrate according to an example embodiment of the present invention includes a base substrate, a first metal pattern, a second metal pattern, a first transparent conductive layer and a second transparent conductive layer. The first metal pattern is formed on the base substrate, and includes a gate line and a gate electrode connected to the gate line. The second metal pattern includes a data line crossing the gate line, a source electrode connected to the data line and a drain electrode being spaced apart from the source electrode. The first transparent conductive layer includes a capping layer capping the second metal pattern and a common electrode formed in a pixel area. The second transparent conductive layer includes a pixel electrode having a plurality of openings, contacting the capping layer capping the drain electrode, and facing the common electrode.

A method of manufacturing a display substrate according to another example embodiment of the present invention will be described hereinafter. A first metal pattern including a gate line and a gate electrode connected to the gate line is formed on a base substrate. A gate insulating layer is formed on the base substrate having the first metal pattern thereon. A second metal pattern including a data line crossing the gate line, a source electrode connected to the data line and a drain electrode being spaced apart from the source electrode is formed on the base substrate having the gate insulating layer formed thereon. A first transparent conductive layer including a capping layer capping the second metal pattern and a common electrode is formed in a pixel area.

A second transparent conductive layer including a pixel electrode is formed on the base substrate having the first transparent conductive layer formed thereon. The pixel electrode has a plurality of openings, contacts the capping layer capping the drain electrode, and faces the common electrode.

According to the display substrate and the method of manufacturing the display substrate, the capping layer capping the second metal pattern and the common electrode are formed using the first transparent conductive material. Therefore, the common electrode and the capping layer are formed through one etching process, so that a short between the common electrode and the metal pattern adjacent to the common electrode may be prevented.

BRIEF DESCRIPTION OF THE DRAWINGS

The above and other features and advantages of the present invention will become more apparent by describing in detailed example embodiments thereof with reference to the accompanying drawings, in which.

DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention is explained in detail with reference to the accompanying drawings.

Figure 1:
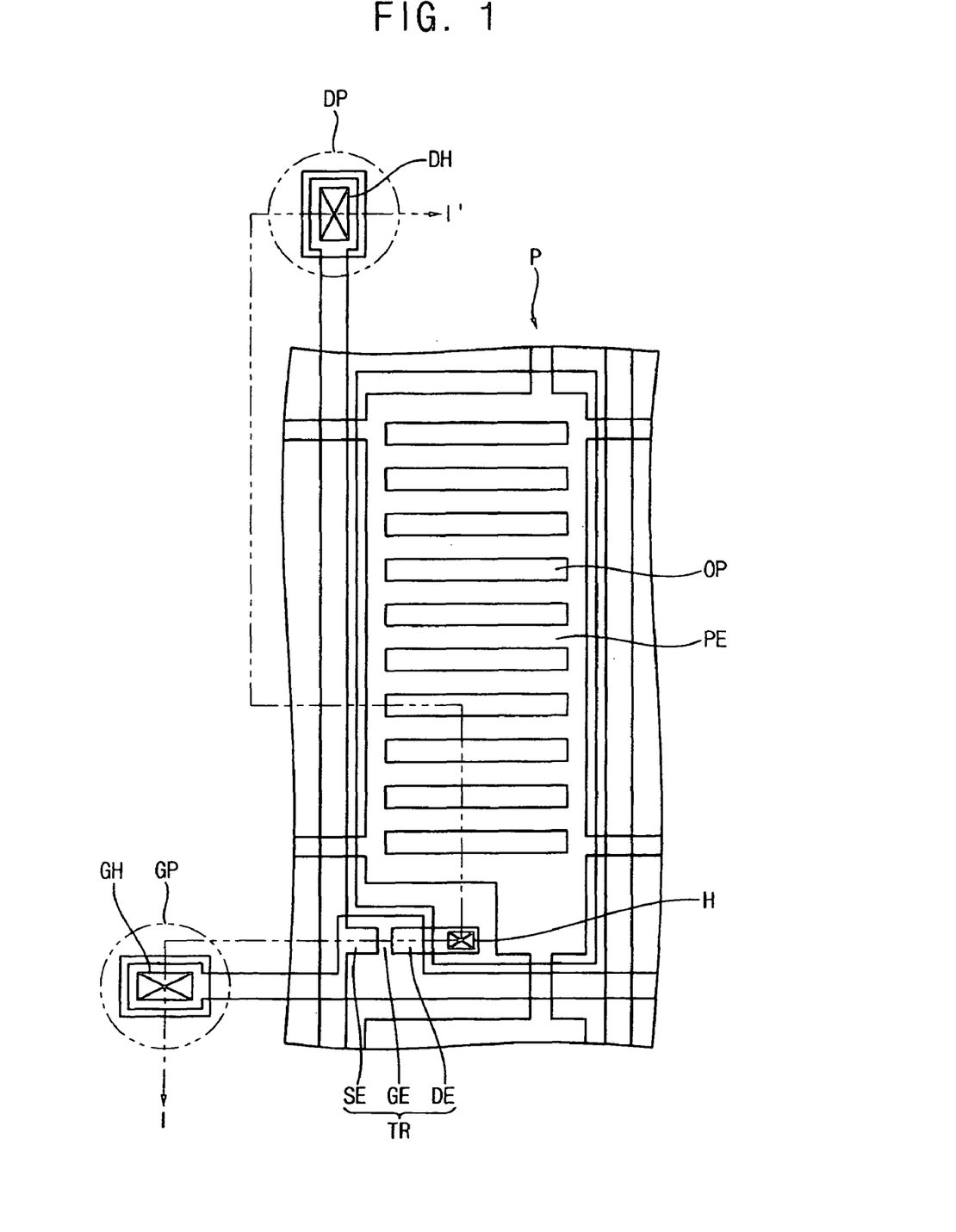
FIG. 1 is a plan view partially illustrating a display panel according to a first embodiment of the present invention.
Figure 2:
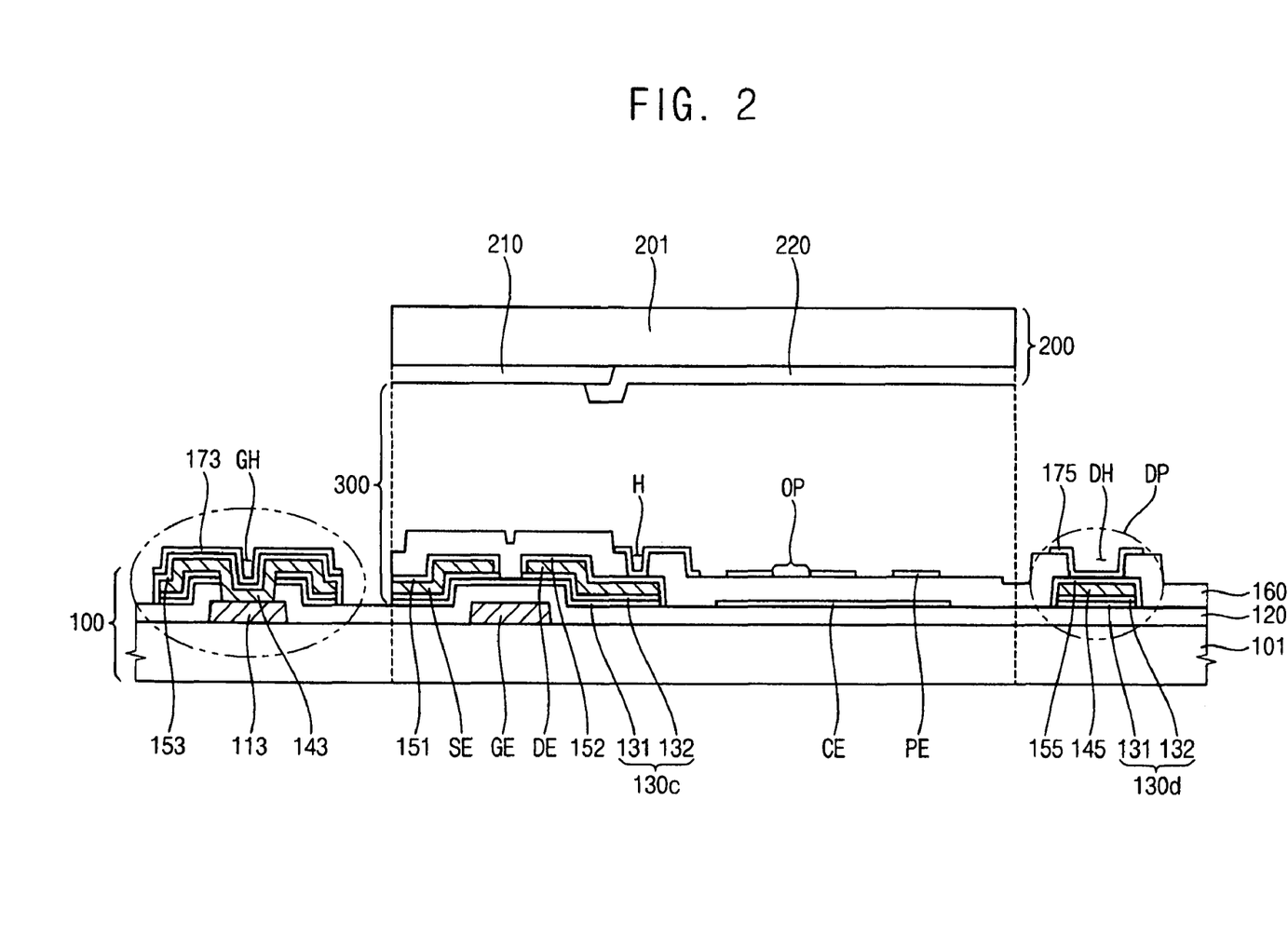
FIG. 2 is a cross-sectional view taken along a line I-I' in FIG. 1.

FIG. 1 is a plan view partially illustrating a display panel according to a first embodiment of the present invention. FIG. 2 is a cross-sectional view taken along a line I-I' in FIG. 1.

Referring to FIGS. 1 and 2, a display panel includes a display substrate 100, an opposing substrate 200 and a liquid crystal layer 300 disposed between the display substrate 100 and the opposing substrate 200.

The display substrate 100 includes a first base substrate 101. The first base substrate 101 is formed using a transparent material that transmits light. For example, the first base substrate may be formed using glass. The first base substrate 101 has a display area and a peripheral area that surrounds the display area. A plurality of pixels P are formed in the display area. A gate pad GP and a data pad DP receiving a driving signal that is provided to the pixel P are formed in the peripheral area.

The pixel P includes a switching element TR connected to a gate line GL and a data line crossing the gate line, a pixel electrode PE connected to the switching element TR, and a common electrode CE opposite to the pixel electrode PE.

The switching element TR includes a gate electrode GE connected to the gate line GL, a source electrode SE connected to the data line DL, and a drain electrode DE spaced apart from the source electrode SE. The drain electrode DE is electrically connected to the source electrode SE through a channel part 130c.

The gate line GL and the gate electrode GE are a first metal pattern that is patterned from a gate metal layer. A gate insulating layer 120 is formed on the gate line GL and the gate electrode GE. For example, the gate insulating layer 120 may be formed using silicon nitride (SiNx) and may be formed to a thickness of about 3,500 Å to about 4,500 Å.

The channel pattern 130c includes a semiconductor layer 131 and an ohmic contact layer 132. For example, the semiconductor layer 131 may include amorphous silicon and the ohmic contact layer 132 may include amorphous silicon doped with n+ ions.

A second metal pattern including the data line DL, the source electrode SE and the drain electrode DE are formed by patterning a source metal layer. A channel pattern 130c and 130d is formed under the second metal pattern. The channel pattern 130c and 130d includes the semiconductor layer 131 and the ohmic contact layer 132.

The second metal pattern that includes the source electrode SE, the drain electrode DE and the data line DL are capped by a source capping layer 151, a drain capping layer 152 and a line capping layer 155, respectively. The capping layers 151, 152 and 155 cap the second metal pattern and the channel pattern 130c and 130d. The source capping layer 151, the drain capping layer 152 and the line capping layer 155 cap an upper surface and a side surface of the source electrode SE, an upper surface and a side surface of the drain electrode DE, and an upper surface and a side surface of the data line DL, respectively. The source and drain capping layers 151 and 152 cap a side surface of the channel pattern 130d and 130c formed under the source and drain electrodes SE and DE.

Herein, the line capping layer 155 caps the upper surface and the side surface of the data line DL, such as the data pad part DP shown in FIG. 2. The data pad part DP includes the end 145 of the data line DL and the line capping layer 155 that caps an upper surface and a side surface of the end.

The source capping layer 151, the drain capping layer 152 and the line capping layer 155 are formed using a first transparent conductive material. The first transparent conductive material may include for example indium tin oxide (ITO), indium zinc oxide (IZO), or amorphous indium tin oxide (a-ITO).

The common electrode CE is formed using the first transparent conductive material in a pixel area defined by the pixel P. The common electrode CE is formed on the gate insulating layer in the pixel area.

A protective layer 160 is formed on the first base substrate 101 having the switching element TR and the common electrode CE formed thereon. For example, the protective layer 160 may be formed using materials such as silicon nitride (SiNx), and silicon oxide (SiOx). The protective layer 160 may be formed to a thickness of about 4,000 Å to about 6,000 Å

The pixel electrode PE is formed on the protective layer 160 corresponding to the common electrode CE and using a second transparent conductive material. The pixel electrode PE has a plurality of openings and is electrically connected to the switching element TR through the contact hole indicated by reference character H. The second transparent conductive material may include materials such as indium tin oxide (ITO), indium zinc oxide (IZO), and amorphous indium tin oxide (a-ITO).

A horizontal electric field and a vertical electric field are formed by the openings indicated by reference character OP in the pixel electrode PE between the pixel electrode PE and the common electrode CE. The horizontal and vertical electric fields control an arrangement angle of liquid crystal molecules of the liquid crystal layer 300 to control a transmittance of light. As illustrated in FIG. 1, openings OP are uniformly spaced apart from each other.

A structure that has the common electrode CE formed between the gate insulating layer 120 and the protective layer 160 is known as a "Middle VCOM" structure.

The gate pad part GP is formed on an end 113 of the gate line GL and receives a gate signal. The data pad part DP is formed on an end 145 of the data line DL and receives a data signal.

The gate pad part GP includes a connection electrode 143 connected to the end 113 through a gate pad hole GH, a connection capping layer 153 that caps the connection electrode 143 and a gate pad electrode 173 formed on the connection electrode 143. The gate pad hole GH is formed by patterning the gate insulating layer 120. The connection capping layer 153 is formed by using the first transparent conductive material. The gate pad electrode 173 is formed by using the second transparent conductive material.

The data pad part DP includes a line capping layer 155 that caps an end 145 of the data line DL and a data pad electrode 175 connected to the line capping layer 155 through a data pad hole DH. The channel pattern 130d is formed under the end 145 and includes the semiconductor layer 131 and the ohmic contact layer 132.

The data pad hole DH is formed by patterning the protective layer 160. The line capping layer 155 is formed using the first transparent conductive material. The data pad electrode 175 is formed using the second transparent conductive material.

The opposing substrate 200 includes a second base substrate 201, a shield layer 210 and a color filter 220. The shield layer 210 is formed on the second base substrate 201 corresponding to the gate line GL, the data line DL and the switching element TR. The color filter 220 is formed on the second base substrate 201 corresponding to the pixel electrode PE.

FIGS. 3 to 8 are cross-sectional views illustrating processes for manufacturing the display substrate shown in FIG. 2.

Figure 3:
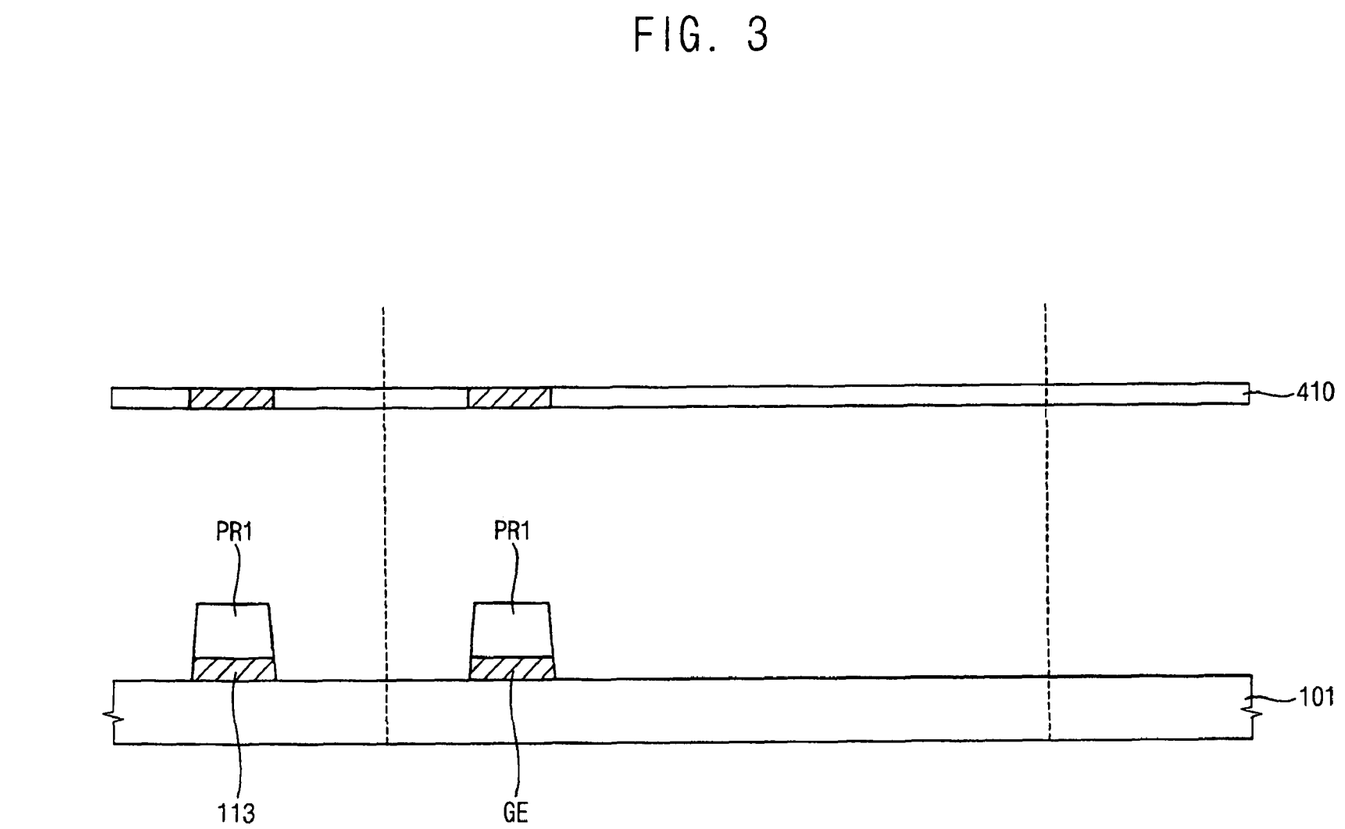
FIGS. 3 to 8 are cross-sectional views illustrating processes for manufacturing the display substrate shown in FIG. 2.

Referring to FIGS. 1 and 3, a first metal layer (not shown) is formed on a base substrate 101.

For example, the first metal layer may be formed using chromium (Cr), aluminum (Al), tantalum (Ta), molybdenum (Mo), titanium (Ti), tungsten (W), copper (Cu), silver (Ag). These may be used alone or in a combination thereof. The first metal layer (not shown) is formed through a sputtering process. In addition, the first metal layer may include two layers having physical or chemical properties different from each other. A photoresist material is coated on the first metal layer to form a photoresist film. For example, the photoresist film may include a positive photoresist of which a portion exposed to light is removed by a developing solution.

The photoresist film is patterned through a photo process using a first mask MASK1 to form a first photoresist pattern PR1. The first metal layer is patterned through an etching process using the first photoresist pattern PR1 to form a first metal pattern including a gate line GL, an end 113 of the gate line GL and a gate electrode GE.

The gate line GL is extended in a first direction on the base substrate 101. The gate electrode GE protrudes from the gate line GL.

For example, the etching process for forming the first metal pattern may correspond to a wet etching process. When the etching process forming the first metal pattern is finished, the first photoresist pattern PR1 is removed through a strip process.

Figure 4:
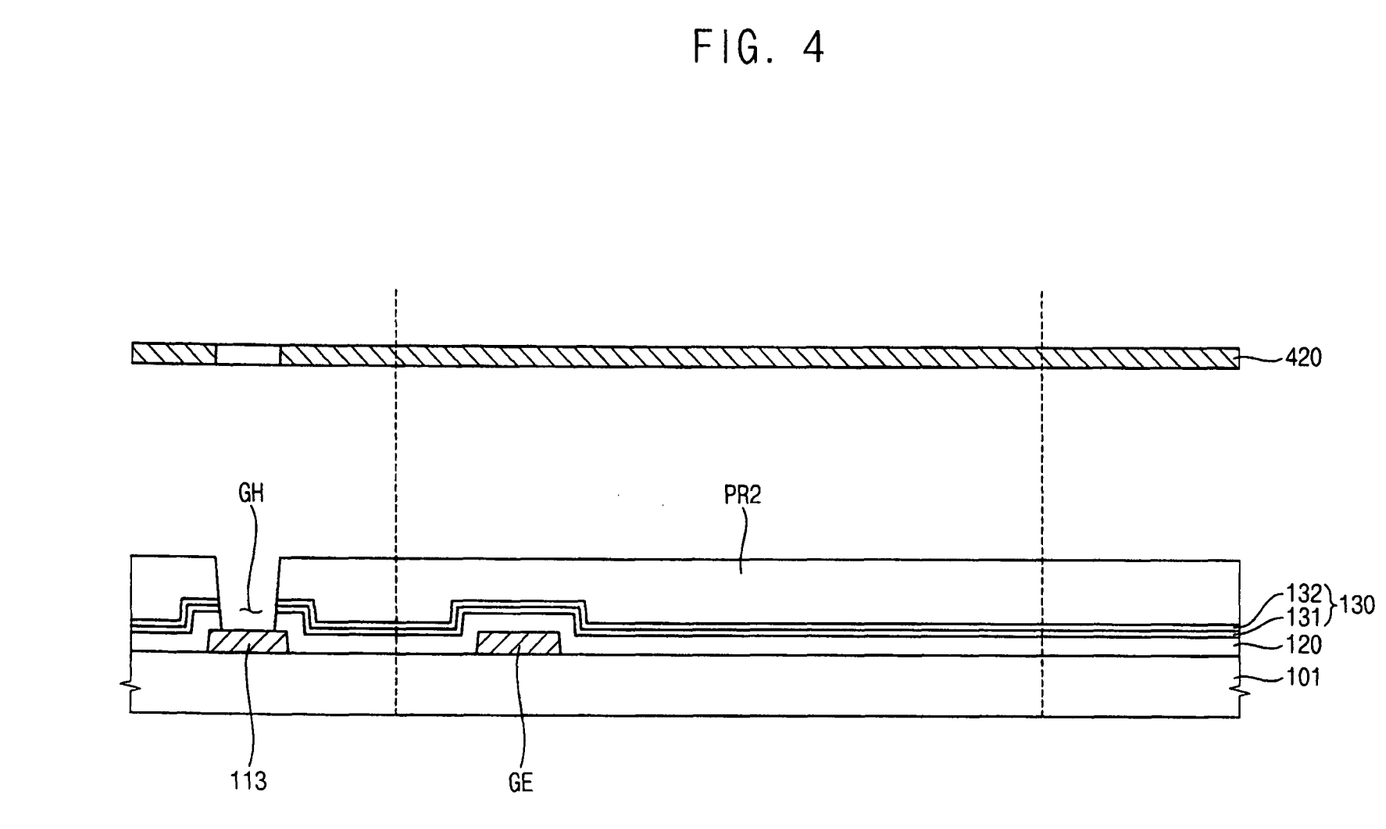

Referring to FIGS. 1 and 4, a gate insulating layer 120 is formed on the base substrate 101 having the first metal pattern formed thereon through a chemical vapor deposition (CVD) method. For example, the gate insulating layer 120 may be formed using silicon nitride (SiNx), or silicon oxide (SiOx). The gate insulating layer 120 may include two layers which are formed through methods different from each other and have materials different from each other. The gate insulating layer 120 may be formed to a thickness of about 3,500 Å to about 4,500 Å.

Then, a semiconductor layer 131 and an ohmic contact layer 132 are sequentially formed on the gate insulating layer 120 through the CVD method. For example, the semiconductor layer may be formed using amorphous silicon, and the ohmic contact layer 132 may be formed using amorphous silicon doped with an n-type dopant at a high concentration.

A second photoresist pattern PR2 is formed on the ohmic contact layer 132 through a photo process using a second mask 420. The channel 130 and the gate insulating layer 120 are simultaneously patterned through an etching process using the second photoresist pattern to form a gate pad hole GH exposing the end 113 of the gate line GL. When the etching process forming the gate pad hole GH is finished, the second photoresist pattern PR2 is removed through a strip process.

Figure 5A:
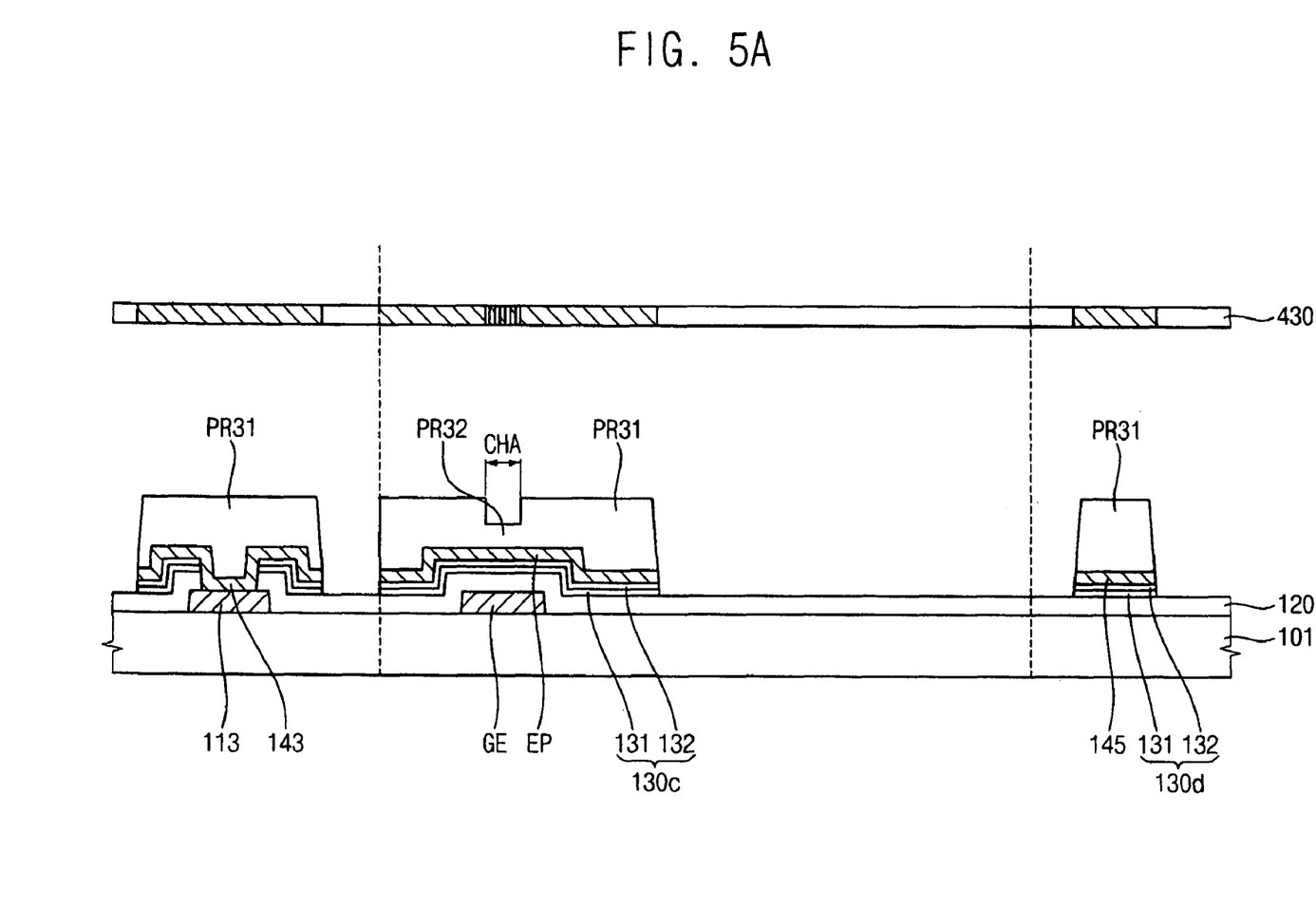

Referring to FIGS. 1 and 5A, a second metal layer (not shown) is formed on the base substrate 101 having the gate pad hole GH formed thereon.

For example, the second metal layer may be formed using chromium (Cr), aluminum (Al), tantalum (Ta), molybdenum (Mo), titanium (Ti), tungsten (W), copper (Cu), or silver (Ag). These may be used alone or in a combination thereof. The second metal layer (not shown) is formed through a sputtering process. In addition, the second metal layer may include two layers having physical or chemical properties different from each other.

A photoresist material is coated on the second metal layer to form a photoresist film. The photoresist film is patterned using a third mask 430 to form a third photoresist pattern. The third photoresist pattern includes a first photo pattern PR31 and a second photo pattern PR32. The first photo pattern PR31 has a first thickness and is formed on an area corresponding to the data line DL, the connection electrode 143 of the gate pad part GP, the end 145 of the data line DL, the source electrode SE and the drain electrode DE. The second photo pattern PR32 has a second thickness thinner than the first thickness, and is formed in a space that is a channel area CHA between the source and drain electrodes SE and DE.

The second metal layer and the channel layer 130 are patterned using the third photoresist pattern PR31 and PR32 to form the data line DL, the connection electrode 143, the end 145 of the data line DL and an electrode pattern EP.

The data line DL is extended in the second direction crossing the gate line GL. The connection electrode 143 is connected to the end 113 of the gate line GL through the gate pad hole GH. The electrode pattern EP overlapped with the gate electrode GE includes the source and drain electrodes SE and DE. That is, the electrode pattern EP is the second metal pattern that is a remaining portion of the second metal layer corresponding to the channel area CHA.

In addition, a channel pattern patterned using the channel layer 130 is formed under the data line DL, the end 145 and the connection electrode EP, respectively. As shown in FIG. 5A, the channel pattern 131c is formed under the electrode pattern EP, and the channel pattern 130d is formed under the end 145 of the data line DL.

Figure 5B:
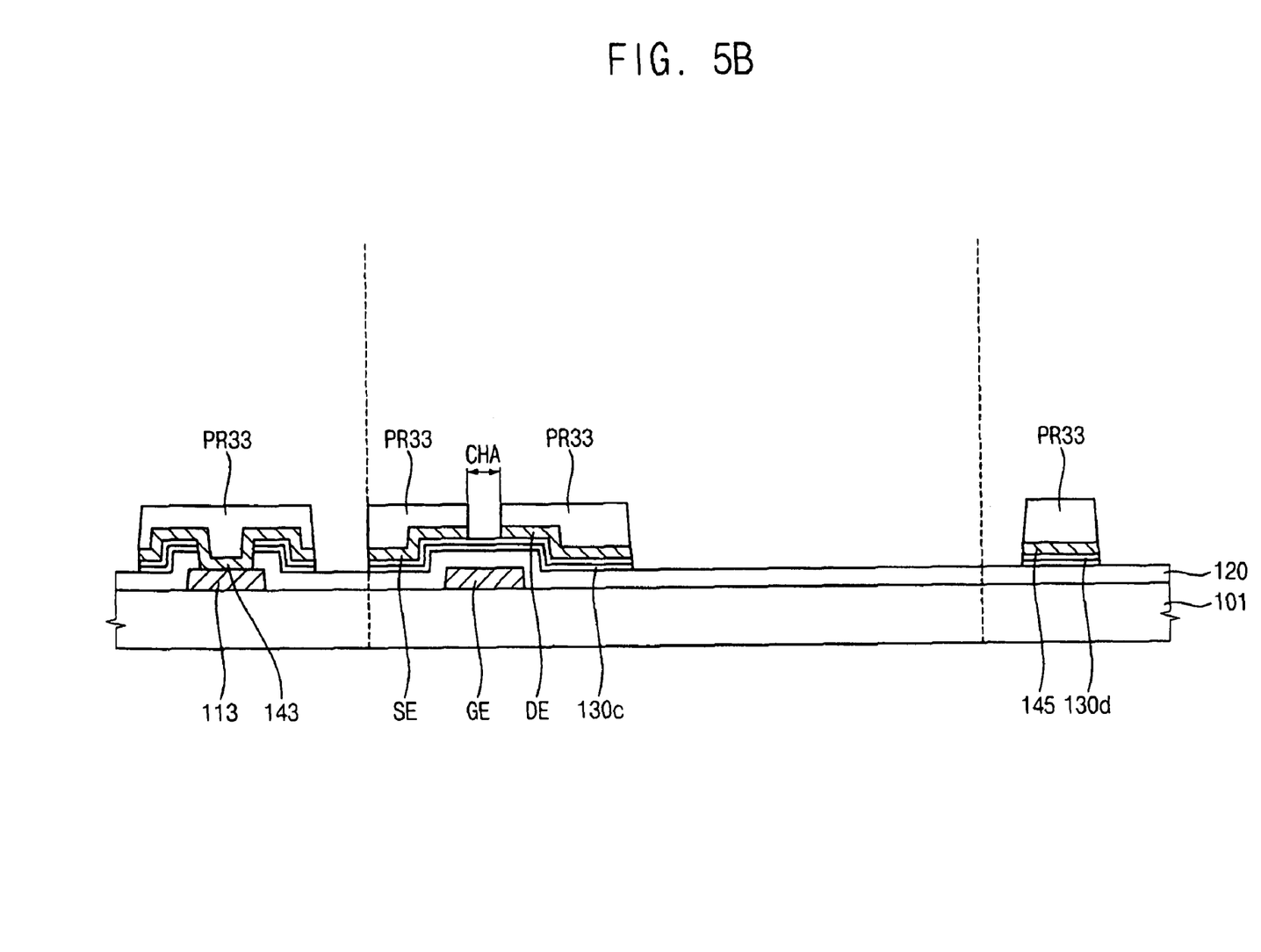

Referring to FIGS. 1 and 5B, a thickness of the third photoresist pattern PR31 and PR32 is reduced through an ashing process. In detail, the thickness of the third photoresist pattern PR31 and PR32 is removed through the ashing process so that the first photo pattern PR31 forms a third photo pattern PR33. The third photo pattern PR33 is formed on an area corresponding to the connection electrode 143, the end of the data line DL, the source electrode SE, and the drain electrode DE.

The electrode pattern EP is patterned using the third photo pattern PR33 to form the source electrode SE and the drain electrode DE spaced apart from the source electrode SE. The third photo pattern PR33 is removed through a strip process.

Figure 6:
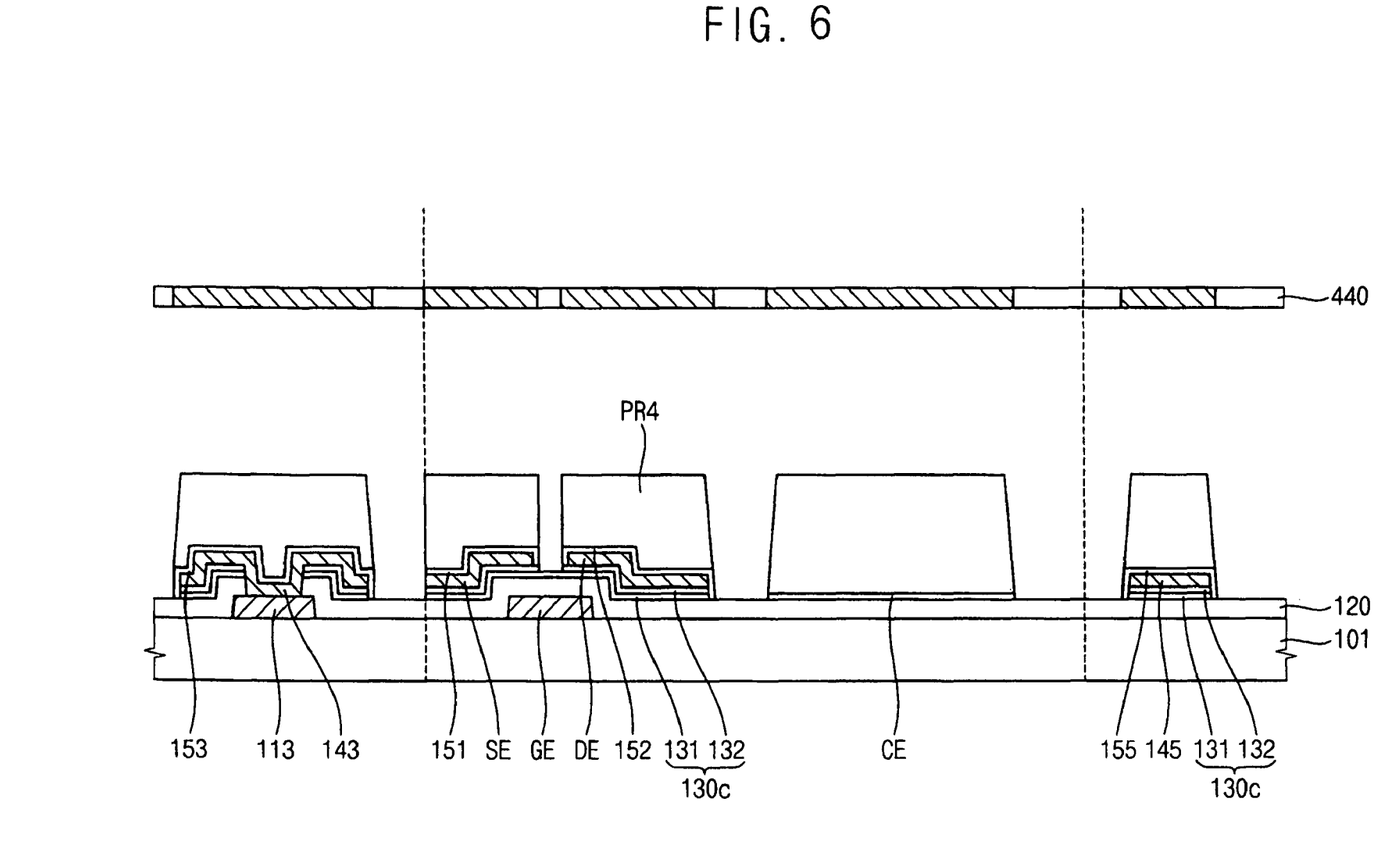

Referring to FIGS. 1 and 6, a first transparent conductive layer (not shown) is formed on the base substrate 101 having the source and drain electrodes SE and DE formed thereon. The first transparent conductive layer may include indium tin oxide (ITO), indium zinc oxide (IZO), or amorphous indium tin oxide (a-ITO). The first transparent conductive layer may be formed through a sputtering process and may be formed to a thickness of about 700 Å.

A photoresist material is spread on the first transparent conductive layer to form a photoresist film. The photoresist film is patterned using a fourth mask 440 to form a fourth photoresist pattern PR4. The first transparent conductive layer is patterned using the fourth photoresist pattern PR4 to form the capping layer and a common electrode CE. The capping layer caps the source electrode SE, the drain electrode DE, the connection electrode 143, the data line DL, the end 145 of the data line DL.

For example, the capping layer may include a source capping layer 151 capping the source electrode SE, a drain capping layer 152 capping the drain electrode DE, a connection capping layer 153 capping the connection electrode 143, and the line capping layer 155 capping the data line DL and the end 145 of the data line DL. The capping layers 151, 152, 153 and 155 cap a side surface of the channel pattern formed under the second metal pattern.

The common electrode CE is formed on a pixel area defined the pixel, having the plate shape. The common electrode CE is electrically connected to a common electrode CE formed adjacent to a pixel area.

The capping layer formed using the first transparent conductive layer caps the second metal pattern, so that a short between the common electrode CE and the second metal pattern adjacent to the common electrode CE may be prevented.

For example, the common electrode CE formed using the first transparent conductive layer, and the second metal pattern formed using the second metal layer are formed on the same layer adjacent to each other, so that a short between the common electrode CE and the second metal pattern adjacent to the common electrode CE may occur. The short occurs due to a residue of the first transparent conductive layer and the second metal layer generated through a manufacturing process.

According to an example embodiment, the capping layer capping the second metal pattern and the common electrode CE are formed using the same material, and patterned through one etching process. Thus, a short between the common electrode CE and the second metal pattern adjacent to the common electrode CE may be prevented.

When a process forming the capping layer and the common electrode CE is finished, the ohmic contact layer 132 is etched using the source and drain electrodes SE and DE, on which the source and drain capping layers 151 and 152 have been formed, as a mask to expose the semiconductor layer 131 of the channel area CHA.

The source and drain capping layers 151 and 152 protect the source and drain electrodes SE and DE in the process of etching the ohmic contact layer 132. Therefore, the source and drain electrodes SE and DE, on which the source and drain capping layers 151 and 152 have been formed, is used as a mask, so that the source and drain electrodes SE and DE may be prevented from damage.

For example, in case the source and drain electrodes SE and DE are used as a mask in the process of etching the ohmic contact layer without having formed the source and drain capping layers 151 and 152 thereon, the source and drain electrodes SE and DE may be etched by a thickness of about 0.4 μm to generate a skew.

According to an example embodiment, the source and drain electrodes SE and DE may be prevented from damage.

After the ohmic contact layer 132 is etched, the fourth photoresist pattern PR4 is removed through a strip process.

Figure 7:
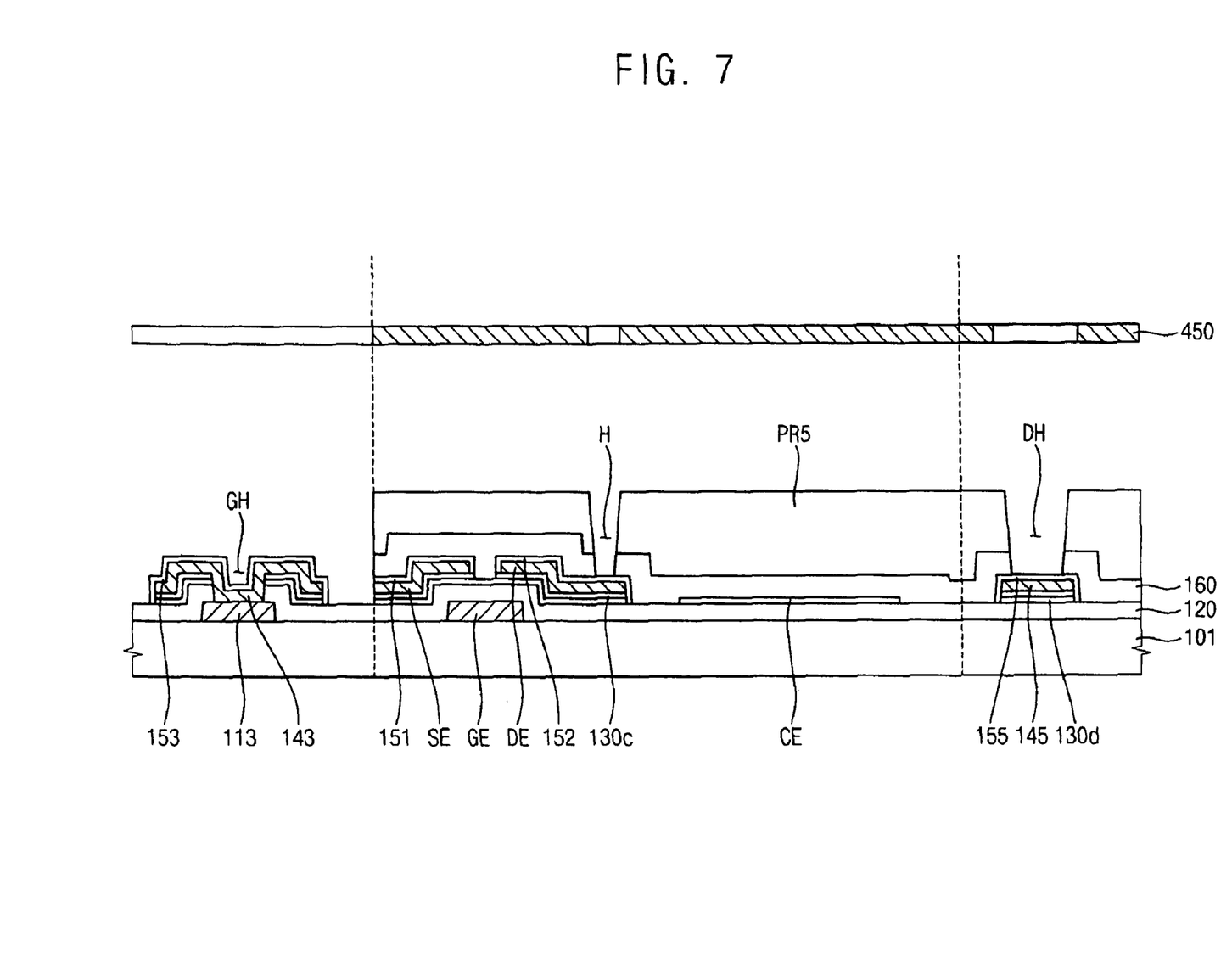

Referring to FIGS. 1 and 7, a protective layer 160 is formed on the base substrate 101 having the common electrode CE formed thereon. For example, the protective layer 160 may be formed using silicon nitride (SiNx), silicon oxide (SiOx), and may be formed through a CVD method. Alternatively, the protective layer 160 may include an organic material. The protective layer 160 may be formed to a thickness of about 4,000 Å to about 6,000 Å.

A photoresist material is spread on the protective layer 160 to form a photoresist film. The photoresist film is patterned using a fifth mask 450 to form a fourth photoresist pattern PR5.

The protective layer 160 is etched using the fifth photoresist pattern PR5 to form a contact hole H exposing the drain capping layer 152 and a data pad hole DH exposing the line capping layer 155. The drain capping layer 152 caps the drain electrode DE, and the line capping layer 155 caps the data line DL.

An area of the protective layer 160, in which the gate pad part GP is formed, is removed to expose the connection capping layer 153. The protective layer 160 formed the gate pad part GP may be partially removed to expose the connection capping layer.

After the contact hole H and the data pad hole DH are formed, the fifth photoresist pattern PR5 is removed through a strip process.

Figure 8:
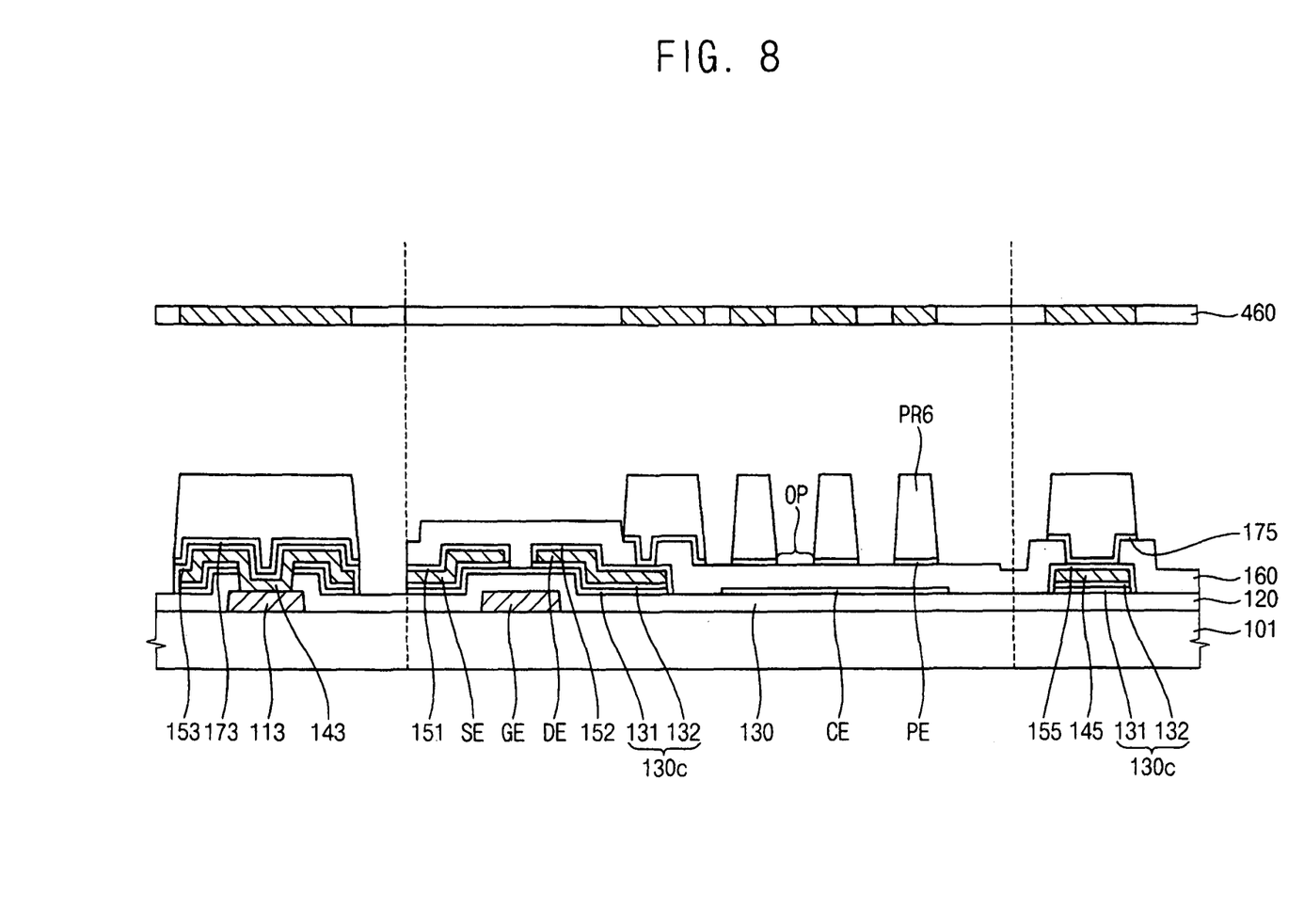

Referring to FIGS. 1 and 8, the transparent conductive layer (not shown) is formed on the base substrate 101 having the contact hole H and the data pad hole DH formed thereon. The second transparent conductive layer may include indium tin oxide (ITO), indium zinc oxide (IZO), amorphous indium tin oxide (a-ITO). The second transparent conductive layer may be formed through a sputtering process and may be formed to a thickness of about 500 Å.

A photoresist material is spread on the second transparent conductive layer to form a photoresist film. The photoresist film is patterned using a sixth mask 460 to form a fourth photoresist pattern PR6. The second transparent conductive layer is patterned using the fourth photoresist pattern PR6 to form the pixel electrode PE, the gate pad electrode 173 and data pad electrode 175.

The pixel electrode PE is electrically connected to the drain electrode DE through the contact hole H and faces the common electrode CE. The pixel electrode PE includes a plurality of openings OP uniformly spaced apart from each other. A fringe field is formed between the pixel electrode PE including openings OP uniformly spaced apart from each other and the common electrode CE. A storage capacitor of the pixel includes the common electrode CE, the protective layer 160 and the pixel electrode PE.

The openings OP are formed substantially parallel with the gate line GL extended in the first direction. However, the openings OP may be formed substantially parallel with the data line DL extended in the second direction. In addition, the openings OP may be formed in a wedge shape, a V-shape.

The gate pad electrode 173 contacts the connection capping layer 153, and the data pad electrode 175 contacts the line capping layer 155 on the end 145.

After the pixel electrode PE, the gate pad electrode 173 and the data pad electrode 175 are formed, the sixth photoresist pattern PR6 is removed through a strip process.

Figure 9:
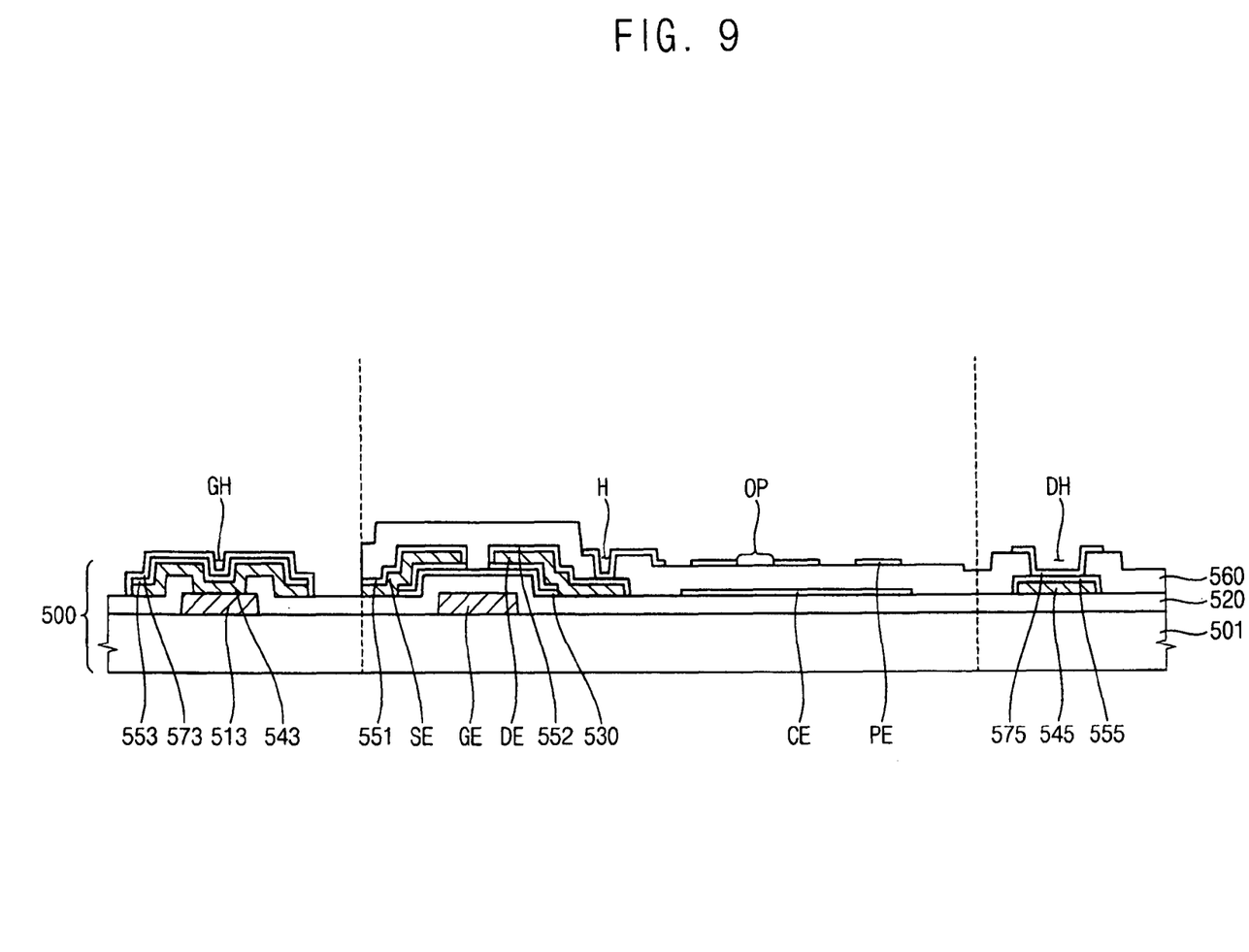
FIG. 9 is a cross-sectional view illustrating a display substrate according to a second embodiment of the present invention.

FIG. 9 is a cross-sectional view illustrating a display substrate according to a second example embodiment of the present invention.

Referring to FIGS. 2 and 9, a display substrate 500 includes a channel layer and a second metal layer patterned using masks different from each other. Therefore, the channel layer and the second metal layer may be patterned to have different shapes from each other when viewed in a plan view.

The display substrate 500 is substantially the same as in the first example embodiment. Thus, the same or like parts as those described in the first example embodiment and any further repetitive explanation concerning the above elements will be briefly described.

The display substrate 500 includes a pixel P, a gate pad part GP and a data pad part DP.

The pixel P includes a switching element TR, a common electrode CE and a pixel electrode PE. The switching element TR includes a gate electrode GE connected to the gate line GL, a source electrode SE connected to the data line DL, and a drain electrode DE spaced apart from the source electrode SE. The drain electrode DE is electrically connected to the source electrode SE through a channel part 530.

The gate electrode GE is formed using the first metal layer and the gate insulating layer 520 is formed on a base substrate 501 having the gate electrode GE formed thereon. The channel part 530 includes a semiconductor layer formed using amorphous silicon and an ohmic contact layer formed using amorphous silicon doped with n+ ions. The source and drain electrodes SE and DE are formed using the second metal layer and are capped a source capping layer 551 and a drain capping layer 552 formed using a transparent conductive material, respectively.

The common electrode CE is formed using the first transparent conductive material in a pixel area defined the pixel P. The common electrode CE is formed on the gate insulating layer in the pixel area. A protective layer 560 is formed on the switching element TR and the common electrode CE.

The pixel electrode PE is formed using the second transparent conductive material on the protective layer 560 and is electrically connected to the switching element TR. A storage capacitor of the pixel P includes the common electrode CE, the protective layer 560 and the pixel electrode PE.

The pixel electrode PE includes a plurality of openings OP uniformly spaced apart from each other. A fringe field is formed between the pixel electrode PE including openings OP uniformly spaced apart from each other and the common electrode CE.

The gate pad part GP includes a connection electrode 543 connected to the end 513 through a gate pad hole GH, a connection capping layer 553 that caps the connection electrode 543 and a gate pad electrode 573 formed on the connection electrode 543. The gate pad hole GH is formed by patterning the gate insulating layer 520. The connection capping layer 553 is formed by using the first transparent conductive material. The gate pad electrode 573 is formed by using the second transparent conductive material.

The data pad part DP includes a line capping layer 555 that caps an end 545 of the data line DL and a data pad electrode 575 connected to the line capping layer 155 through a data pad hole DH.

The data pad hole DH is formed by patterning the protective layer 560. The line capping layer 555 is formed using the first transparent conductive material. The data pad electrode 575 is formed using the second transparent conductive material.

A process of manufacturing of the display substrate is summarized below.

A first metal layer (not shown) is formed on a base substrate 501. The first metal layer is patterned using a first mask to form a first metal pattern including the gate line GL and gate electrode GE.

A gate insulating layer 520 is formed on the base substrate 501 having the first metal pattern formed thereon. The gate insulating layer 520 is patterned using a second mask to form the gate pad hole GH exposing the end 513 of the gate line GL.

A semiconductor layer 531 and an ohmic contact layer 532 are sequentially formed on the base substrate 501 having the gate pad hole GH formed thereon. The semiconductor and ohmic contact layers 531 and 532 are patterned using a third mask to form the channel pattern 530 overlapped with the gate electrode GE.

A second metal layer is formed on the base substrate 501 having the channel pattern 530 formed thereon. The second metal layer is patterned using a fourth mask to form a second metal pattern including the source electrode SE, the drain electrode DE, the data line DL, the connection electrode 543 and the end 545 of the data line DL.

The first transparent conductive layer is formed on the base substrate 501 having the second metal pattern formed thereon. The first transparent conductive layer is patterned using a fifth mask to form the capping layers 551, 552, 553 and 555 and the common electrode CE. The ohmic contact layer 532 of the channel area between the source and drain electrodes SE and DE is removed.

The protective layer 560 is formed on the base substrate 501 having the common electrode CE formed thereon. The protective layer is patterned using the sixth mask to form the contact hole H on the drain electrode DE and the data pad hole on the end 545 of the data line DL.

The second transparent conductive layer is formed on the base substrate 501 having the contact hole H and the data pad hole DH formed thereon. The second transparent conductive layer is patterned using a seventh mask to form the pixel electrode PE, the gate pad electrode 573 and the data pad electrode 575.

According to an example embodiment of the present invention, a metal pattern including a data line, a source electrode and a drain electrode are capped using a transparent conductive material forming a common electrode. That is, a capping layer capping the metal pattern is formed using the transparent conductive material. Therefore, the common electrode and the capping layer are formed through one etching process, so that a short between the common electrode and the metal pattern adjacent to the common electrode may be prevented.

In addition, an ohmic contact layer formed in a channel area of a switching element is etched using the source electrode and the drain electrode, which has been capped by the capping layer, as a mask, so that damage to the source electrode and the drain electrode forming a metal layer may be prevented.

In addition, a channel layer and the metal layer are simultaneously patterned using one mask, so that manufacturing costs of the display substrate may be decreased.

Having described the example embodiments of the present invention and its advantage, it is noted that various changes, substitutions and alterations can be made herein without departing from the spirit and scope of the invention as defined by appended claims.

What is claimed is:

1. A display substrate comprising:
    a base substrate;
    a first metal pattern formed on the base substrate and including a gate line and a gate electrode connected to the gate line;
    a second metal pattern including a data line crossing the gate line, a source electrode connected to the data line and a drain electrode being spaced apart from the source electrode;
    a first transparent conductive layer including a capping layer capping the second metal pattern and a common electrode formed in a pixel area; and
    a second transparent conductive layer including a pixel electrode having a plurality of openings, contacting the capping layer capping the drain electrode, and facing the common electrode,
    wherein the capping layer contacts the second metal pattern.

2. The display substrate of claim 1, further comprising:
    a gate insulating layer formed between the first metal pattern and the second metal pattern, and having a gate pad hole formed on an end of the gate line.

3. The display substrate of claim 2, wherein the second metal pattern includes a connection electrode contacting the end of the gate line through the gate pad hole.

4. The display substrate of claim 3, wherein the second transparent conductive layer includes a gate pad electrode contacting the capping layer that caps the connection electrode.

5. The display substrate of claim 2, further comprising:
    a channel pattern formed between the second metal pattern and the gate insulating layer.

6. The display substrate of claim 5, wherein the capping layer caps an upper surface and a side surface of the second metal pattern and a side surface of the channel pattern.

7. The display substrate of claim 1, further comprising:
    a protective layer formed between the first and the second transparent conductive layers, and having a contact hole formed on the drain electrode and a data pad hole formed on an end of the data line.

8. The display substrate of claim 7, wherein the second transparent conductive layer includes a data pad electrode contacting the capping layer that caps the end of the data line through the data pad hole.

* * * * *